(12) United States Patent
Lamar

(10) Patent No.: US 8,444,943 B2
(45) Date of Patent: May 21, 2013

(54) METHODS AND APPARATUS FOR SULFUR RECOVERY FROM ACID GASES

(75) Inventor: Justin A. Lamar, Olathe, KS (US)

(73) Assignee: Black & Veatch Corporation, Overland Park, KS (US)

(*) Notice: Subject to any disclaimer, the term of this patent is extended or adjusted under 35 U.S.C. 154(b) by 245 days.

(21) Appl. No.: 12/770,972

(22) Filed: Apr. 30, 2010

(65) Prior Publication Data

US 2011/0268650 A1 Nov. 3, 2011

(51) Int. Cl.
*B01D 53/48* (2006.01)
*B01D 53/52* (2006.01)
*B01D 53/72* (2006.01)
*B01D 53/73* (2006.01)

(52) U.S. Cl.
USPC ........ 423/220; 423/226; 423/228; 423/242.1; 423/242.2; 423/242.4; 423/242.7; 423/245.1

(58) Field of Classification Search
USPC .................. 423/220, 226, 228, 242.1, 242.2, 423/242.4, 242.7, 245.1
See application file for complete search history.

(56) References Cited

U.S. PATENT DOCUMENTS

| | | | |
|---|---|---|---|
| 3,989,811 A | 11/1976 | Hill | |
| 4,052,176 A | 10/1977 | Child et al. | |
| 4,056,606 A | 11/1977 | Germerdonk et al. | |
| 4,085,199 A | 4/1978 | Singleton et al. | |
| 4,124,685 A | 11/1978 | Tarhan et al. | |
| 4,125,597 A | 11/1978 | Fleck | |
| 4,153,674 A | 5/1979 | Verloop et al. | |
| 4,233,276 A | 11/1980 | D'Souza et al. | |
| 4,241,032 A | 12/1980 | Werner et al. | |
| 4,243,648 A * | 1/1981 | Fenton | 423/576.2 |
| 4,356,161 A | 10/1982 | McNamara et al. | |
| 4,425,317 A | 1/1984 | Zeller et al. | |
| 4,678,648 A | 7/1987 | Wynn | |
| 4,795,620 A | 1/1989 | Heisel et al. | |
| 4,892,723 A | 1/1990 | Delaney et al. | |
| 4,919,912 A | 4/1990 | Taggart et al. | |
| 5,102,635 A | 4/1992 | Delaney et al. | |
| 5,104,630 A | 4/1992 | Holmes et al. | |
| 5,716,587 A | 2/1998 | Khanmamedov | |
| 6,962,680 B1 | 11/2005 | Ishigaki et al. | |
| 7,157,070 B2 | 1/2007 | Koss et al. | |
| 7,189,282 B2 | 3/2007 | Huder et al. | |
| 2008/0107581 A1 | 5/2008 | Sparling et al. | |

\* cited by examiner

*Primary Examiner* — Daniel C McCracken
*Assistant Examiner* — Daniel Berns
(74) *Attorney, Agent, or Firm* — Hovey Williams LLP

(57) ABSTRACT

Apparatus and methods for recovering sulfur from acid gases. Acid gases containing relatively high amounts of carbonyl sulfide and/or one or more types of mercaptans can be treated in a sulfur recovery system employing an acid gas enrichment zone and a tail gas treatment zone, where partially-loaded sulfur absorbing solvent from the tail gas treatment zone is employed for sulfur absorption in the acid gas enrichment zone. Off-gas from the acid gas enrichment zone can be combined and hydrogenated with a sulfur recovery unit tail gas thereby increasing the total amount of sulfur recovery from the initial acid gas.

Figure 1:
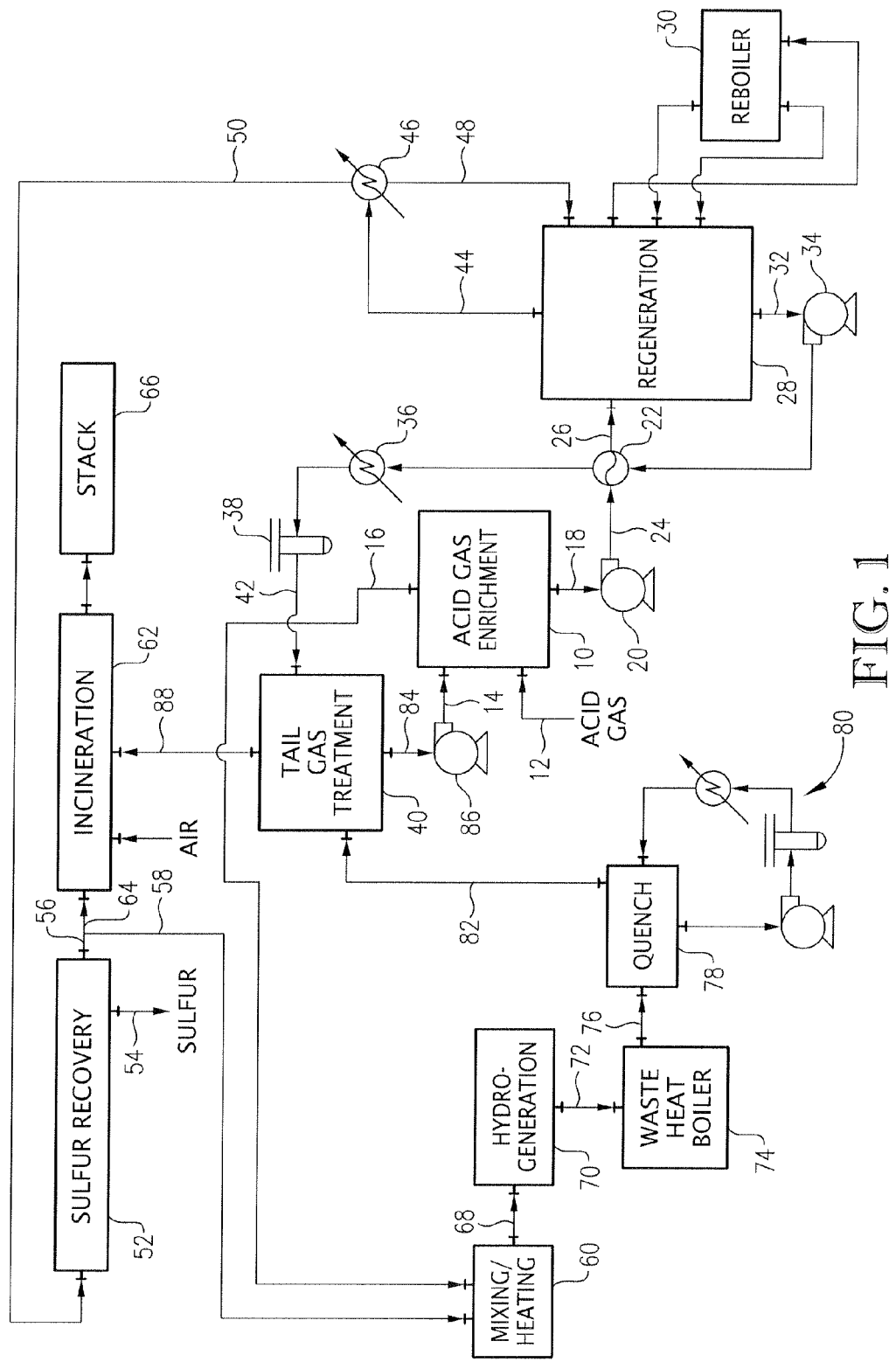

27 Claims, 2 Drawing Sheets

METHODS AND APPARATUS FOR SULFUR RECOVERY FROM ACID GASES

BACKGROUND

1. Technical Field

One or more embodiments of the invention relate to methods and apparatus for recovering sulfur from an acid gas.

2. Description of Related Art

A variety of industrial processes, such as natural gas processing, oil refining, and coal gasification, can produce acid gases that contain carbon dioxide and hydrogen sulfide, as well as other sulfur compounds, such as carbonyl sulfide and/or mercaptans. Such acid gases may be treated to recover valuable sulfur contained therein and to reduce sulfur emissions to the atmosphere. For instance, an acid gas can undergo an enrichment process where the hydrogen sulfide in the acid gas is concentrated and then treated in a Claus sulfur recovery unit. Claus sulfur recovery processes treat such enriched streams to convert hydrogen sulfide into recoverable sulfur while producing an off-gas that is suitable for incineration before venting to the atmosphere. While advances have been made in the art of sulfur recovery from acid gases, improvements are still needed, particularly for lean acid gases.

SUMMARY

One embodiment of the invention concerns a process for recovering sulfur from an acid gas comprising hydrogen sulfide. The method of this embodiment comprises contacting the acid gas with a partially-loaded sulfur absorbing solvent in an acid gas enrichment zone to thereby produce a hydrogen sulfide rich sulfur absorbing solvent and a hydrogen sulfide depleted off-gas, where the hydrogen sulfide depleted off-gas comprises hydrogen sulfide in an amount of at least 0.5 mole percent, and where, prior to contacting, the partially-loaded sulfur absorbing solvent comprises hydrogen sulfide in an amount of at least 0.01 mole percent.

Another embodiment of the invention concerns a process for recovering sulfur from an acid gas comprising hydrogen sulfide. The process of this embodiment comprises: (a) contacting the acid gas in an acid gas enrichment zone with a partially-loaded sulfur absorbing solvent to thereby produce a hydrogen sulfide rich sulfur absorbing solvent and a hydrogen sulfide depleted off-gas; (b) removing at least a portion of the hydrogen sulfide from the hydrogen sulfide rich sulfur absorbing solvent to thereby produce an enriched hydrogen sulfide stream and a regenerated sulfur absorbing solvent; and (c) contacting at least a portion of the regenerated sulfur absorbing solvent with a hydrogenated stream containing hydrogen sulfide to thereby produce the partially-loaded sulfur absorbing solvent, wherein the hydrogen sulfide content of the hydrogen sulfide rich sulfur absorbing solvent is at least 2.6 mole percent.

Yet another embodiment of the invention concerns a sulfur recovery system for recovering sulfur from an acid gas. The sulfur recovery system of this embodiment comprises: an acid gas enrichment absorber vessel containing a sulfur absorbing solvent operable for removing hydrogen sulfide from the acid gas; a sulfur absorbing solvent regenerator in downstream fluid communication with the acid gas enrichment absorber vessel and operable for separating hydrogen sulfide from the sulfur absorbing solvent and generating an enriched hydrogen sulfide stream and a regenerated sulfur absorbing solvent; a Claus sulfur recovery unit in downstream fluid communication with the sulfur absorbent regenerator and operable for recovering sulfur from the enriched hydrogen sulfide stream; a heater/mixer unit in downstream fluid communication with the Claus sulfur recovery unit and the acid gas enrichment vessel and operable for mixing and heating a tail gas from the Claus sulfur recovery unit and a hydrogen sulfide depleted off-gas from the acid gas enrichment absorber vessel; a hydrogenation unit in downstream fluid communication with the heater/mixer unit operable for hydrogenating a hydrogenation feed stream discharged from the heater/mixer unit; a quench column in downstream fluid communication with the hydrogenation unit; and a tail gas treatment absorber vessel in downstream fluid communication with the quench column and operable for removing hydrogen sulfide from a hydrogenated Claus tail gas and acid gas enrichment off-gas.

BRIEF DESCRIPTION OF THE DRAWING FIGURES

Figure 2:
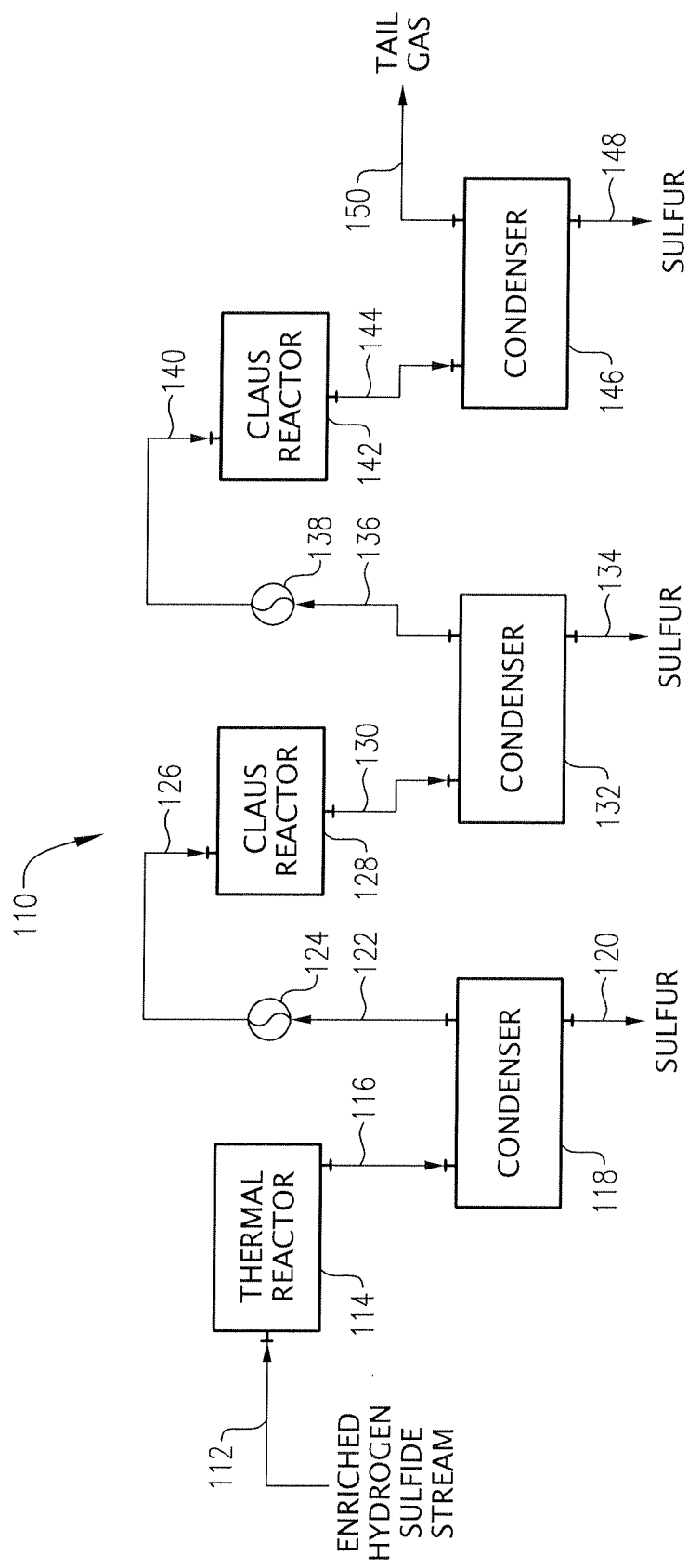

Embodiments of the present invention are described herein with reference to the attached drawing figures, wherein:

FIG. 1 is a process flow diagram illustrating a system for sulfur recovery from an acid gas constructed in accordance with certain embodiments of the present invention, particularly illustrating a configuration where an initial acid gas is contacted in an acid gas enrichment zone with a partially-loaded sulfur absorbing solvent from a tail-gas treatment zone, and where a hydrogen sulfide depleted off-gas from the acid gas enrichment zone is combined with a tail gas from a sulfur recovery zone for treatment in a hydrogenation zone; and FIG. 2 is a process flow diagram illustrating in detail a sulfur recovery unit constructed in accordance with certain embodiments of the present invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Referring initially to FIG. 1, a sulfur removal system is depicted according to an embodiment of the present invention. In the embodiment of FIG. 1, an acid gas can initially be introduced into an acid gas enrichment zone 10 via line 12. As used herein, the term "acid gas" shall denote a substantially vapor-phase stream containing at least 5 mole percent carbon dioxide and at least 1 mole percent hydrogen sulfide. Acid gases can also contain additional components, such as, for example, water; hydrocarbons, such as, for example, methane, ethane, propane, butane, pentane, hexane, ethylene, and/or propylene; carbonyl sulfide ("COS"); and mercaptans (a.k.a., thiols), such as, for example, methyl mercaptan (a.k.a., methanethiol) and ethyl mercaptan (a.k.a., ethanethiol). Examples of acid gases suitable for use include, but are not limited to, acid gases produced during oil refining processes, coal gasification processes, and natural gas sweetening processes. In one or more embodiments, the acid gas in line 12 can comprise an acid gas produced during a natural gas sweetening process.

As mentioned above, acid gases can contain hydrogen sulfide. In one or more embodiments, the acid gas in line 12 can comprise hydrogen sulfide in a concentration of at least 1, at least 5, at least 10, at least 15, at least 20, or at least 25 mole percent. In other embodiments, the acid gas in line 12 can comprise hydrogen sulfide in a concentration of less than 50, less than 40, or less than 30 mole percent. Additionally, the acid gas in line 12 can comprise hydrogen sulfide in an amount in the range of from about 1 to about 50 mole percent, in the range of from about 10 to about 40 mole percent, or in the range of from 20 to 30 mole percent.

As mentioned above, acid gases can contain carbon dioxide. In one or more embodiments, the acid gas in line 12 can comprise carbon dioxide in a concentration of at least 30, at least 40, at least 50, or at least 60 mole percent. Additionally, the acid gas in line 12 can comprise carbon dioxide in an amount in the range of from about 55 to about 85 mole percent, in the range of from about 60 to about 80 mole percent, or in the range of from 65 to 75 mole percent.

As mentioned above, acid gases can contain COS. In one or more embodiments, the acid gas in line 12 can comprise COS in a concentration of at least 0.01, at least 0.02, at least 0.05, at least 0.1, at least 0.15, or at least 0.2 mole percent. Additionally, the acid gas in line 12 can comprise COS in an amount in the range of from about 0.001 to about 1 mole percent, in the range of from about 0.01 to about 0.5 mole percent, or in the range of from 0.02 to 0.25 mole percent.

As mentioned above, acid gases can contain mercaptans. In one or more embodiments, the acid gas in line 12 can have a total mercaptan concentration of at least 0.01, at least 0.02, at least 0.05, at least 0.1, at least 0.15, or at least 0.2 mole percent. Additionally, the acid gas in line 12 can have a total mercaptan concentration in an amount in the range of from about 0.001 to about 1 mole percent, in the range of from about 0.01 to about 0.5 mole percent, or in the range of from 0.02 to 0.25 mole percent. In one or more embodiments, the acid gas in line 12 can have a combined concentration of methyl mercaptan and ethyl mercaptan of at least 0.01, at least 0.02, at least 0.05, at least 0.1, at least 0.15, or at least 0.2 mole percent. As used herein, the term "combined concentration" when used to describe the concentration of two or more components shall denote that any single component can constitute the full assessed concentration, or any combination of the concentrations of two or more or all of the components can be summed to constitute the full assessed concentration. Additionally, the acid gas in line 12 can have a combined concentration of methyl mercaptan and ethyl mercaptan in an amount in the range of from about 0.001 to about 1 mole percent, in the range of from about 0.01 to about 0.5 mole percent, or in the range of from 0.02 to 0.25 mole percent.

As mentioned above, acid gases can contain COS and mercaptans. In one or more embodiments, the acid gas in line 12 can have a combined concentration of COS and one or more types of mercaptans of at least 0.01, at least 0.025, at least 0.05, at least 0.1, at least 0.15, or at least 0.2 mole percent. Additionally, the acid gas in line 12 can have a combined concentration of COS and one or more types of mercaptans in an amount in the range of from about 0.01 to about 2 mole percent, in the range of from about 0.05 to about 1 mole percent, or in the range of from 0.1 to 0.5 mole percent. Furthermore, the combined concentration of COS and mercaptans in the acid gas in line 12 can constitute at least 0.1, at least 0.5, at least 1, or at least 2 mole percent of the total amount of sulfur compounds present in the acid gas in line 12. As used herein, the term "sulfur compound" refers to any sulfur-containing molecule, including elemental sulfur.

The acid gas in line 12 can be primarily in the vapor phase. As used herein the terms "primarily," "predominately," and "majority" shall mean greater than 50 percent. In one or more embodiments, at least 80, at least 90, at least 95, or at least 99 mole percent of the acid gas in line 12 can be in the vapor phase. Additionally, in various embodiments, the acid gas in line 12 can have temperature in the range of from about 10 to about 100° C., in the range of from about 25 to about 85° C., or in the range of from 40 to 50° C. Furthermore, the acid gas in line 12 can have a pressure in the range of from about 0 to about 200 kilopascal gauge ("kPag"), in the range of from about 50 to about 150 kPag, or in the range of from 75 to 125 kPag. Moreover, the acid gas in line 12 can have a volume flow rate in the range of from about 100 to about 10,000 cubic meters per hour ("m$^3$/hr"), in the range of from about 500 to about 5,000 m$^3$/hr, or in the range of from 1,000 to 3,000 m$^3$/hr.

As mentioned above, the acid gas in line 12 can be introduced into acid gas enrichment zone 10. Acid gas enrichment zone 10 can operate to facilitate contact between the acid gas introduced via line 12 and a partially-loaded sulfur absorbing solvent introduced into acid gas enrichment zone 10 via line 14. Any methods or apparatus known or hereafter discovered in the art suitable to facilitate such contact can be employed in acid gas enrichment zone 10. In one or more embodiments, acid gas enrichment zone 10 can be defined within an acid gas enrichment absorber vessel that is configured to facilitate counter-current contact between the acid gas from line 12 and the partially-loaded sulfur absorbing solvent from line 14. Such an acid gas enrichment absorber vessel can comprise an upper inlet for receiving the partially-loaded sulfur absorbing solvent from line 14 and a lower inlet for receiving the acid gas from line 12. In one or more embodiments, acid gas enrichment zone 10 can be defined within a packed or tray column. If a tray column is employed, acid gas enrichment zone 10 can comprise a plurality of contact-enhancing valve trays. In one or more embodiments, acid gas enrichment zone 10 can have in the range of from about 1 to about 30 valve trays. In other embodiments, when a packed column is employed, acid gas enrichment zone 10 can have in the range of from about 1 to about 10 theoretical plates.

Reaction conditions employed in acid gas enrichment zone 10 can be any suitable conditions for achieving acid gas enrichment as described herein. In one or more embodiments, the temperature employed in acid gas enrichment zone 10 can be in the range of from about 25 to about 85° C. Additionally, the pressure employed in acid gas enrichment zone 10 can be in the range of from about 0 to about 200 kPag. Furthermore, the above-mentioned acid gas from line 12 and the partially-loaded sulfur absorbing solvent from line 14 can be present in acid gas enrichment zone 10 in a molar ratio in the range of from about 0.01:1 to about 1:1, in the range of from about 0.03:1 to about 0.3:1, or in the range of from 0.05:1 to 0.15:1.

As is discussed in greater detail below, the partially-loaded sulfur absorbing solvent in line 14 can be a stream resulting from treating a hydrogenated Claus tail gas and acid gas enrichment off-gas with a regenerated sulfur absorbing solvent. As used herein, the term partially-loaded sulfur absorbing solvent shall denote a sulfur absorbing solvent comprising hydrogen sulfide. In one or more embodiments, the partially-loaded sulfur absorbing solvent in line 14 can have a concentration of hydrogen sulfide of at least 0.01 mole percent, at least 0.1 mole percent, or at least 0.5 mole percent. Additionally, the partially-loaded sulfur absorbing solvent in line 14 can have a concentration of hydrogen sulfide in the range of from about 0.01 to about 10 mole percent, in the range of from about 0.05 to about 5 mole percent, or in the range of from 0.1 to 1 mole percent. Furthermore, the partially-loaded sulfur absorbing solvent in line 14 can have a concentration of hydrogen sulfide of less than 5 mole percent, less than 3 mole percent, less than 1 mole percent, less than 0.8 mole percent, less than 0.6 mole percent, less than 0.5 mole percent, less than 0.4 mole percent, or less than 0.3 mole percent.

Furthermore, the partially-loaded sulfur absorbing solvent in line 14 can comprise a sulfur absorbing solvent. Any sulfur absorbing solvent known or hereafter discovered in the art suitable for absorbing one or more types of sulfur compounds from a sulfur-containing stream can be employed as the sulfur absorbing solvent in various embodiments of the present invention. In one or more embodiments, the sulfur absorbing solvent can be a selective sulfur absorbing solvent that preferentially absorbs hydrogen sulfide. Examples of suitable sulfur absorbing solvents include, but are not limited to, alkanolamines, such as, for example, monoethanol amine ("MEA"), diethanolamine ("DEA"), methyldiethanolamine ("MDEA"), diisopropylamine ("DIPA"), and diglycolamine ("DGA"), or mixtures of two or more thereof. An example of a suitable commercially available sulfur absorbing solvent includes, but is not limited to, FLEXSORB, available from ExxonMobil Research and Engineering Company (Fairfax, Va.). In one embodiment, the sulfur absorbing solvent can comprise MDEA.

In one or more embodiments, the partially-loaded sulfur absorbing solvent in line 14 can have a concentration of sulfur absorbing solvent of at least 1 mole percent, at least 5 mole percent, or at least 10 mole percent. Additionally, the partially-loaded sulfur absorbing solvent in line 14 can have a concentration of sulfur absorbing solvent in the range of from about 1 to about 20 mole percent, in the range of from about 5 to about 15 mole percent, or in the range of from 10 to 12 mole percent.

As mentioned above, acid gas enrichment zone 10 can operate to facilitate contact between the acid gas introduced via line 12 and the partially-loaded sulfur absorbing solvent introduced via line 14. Such contact between the acid gas and the partially-loaded sulfur absorbing solvent can cause the partially-loaded sulfur absorbing solvent to absorb hydrogen sulfide and optionally other sulfur compounds from the acid gas thereby forming a hydrogen sulfide depleted off-gas and a hydrogen sulfide rich sulfur absorbing solvent. The hydrogen sulfide depleted off-gas can be withdrawn from acid gas enrichment zone 10 via line 16, while the hydrogen sulfide rich sulfur absorbing solvent can be withdrawn via line 18.

In one or more embodiments, contact between the partially-loaded sulfur absorbing solvent from line 14 and the acid gas from line 12 can be sufficient to remove at least 60, at least 80, or at least 95 mole percent of hydrogen sulfide from the acid gas. Additionally, contact between the partially-loaded sulfur absorbing solvent from line 14 and the acid gas from line 12 can be sufficient to remove in the range of from about 60 to about 100, in the range of from about 80 to about 100, or in the range of from 95 to 100 mole percent of hydrogen sulfide from the acid gas.

It should be noted, however, that according to certain aspects of the present invention, the amount of hydrogen sulfide allowed to exit acid gas enrichment zone 10 with the hydrogen sulfide depleted off-gas in line 16 can be higher than in some other conventional acid gas enrichment processes. Without wishing to be bound by theory, it is believed that this, in combination with various other embodiments of the invention, allows for synergistic energy savings as well as lower capital costs without sacrificing overall sulfur recovery. Accordingly, in one or more embodiments, the hydrogen sulfide depleted off-gas in line 16 can have a hydrogen sulfide concentration of at least 0.1, at least 0.2, at least 0.3, at least 0.4, at least 0.5, at least 0.6, at least 0.7, at least 0.8, at least 0.9, at least 1, at least 1.1, at least 1.2, at least 1.3, at least 1.4, or at least 1.5 mole percent. In other various embodiments, the hydrogen sulfide depleted off-gas in line 16 can have a hydrogen sulfide concentration in the range of from about 0.01 to about 10 mole percent, in the range of from about 0.05 to about 5 mole percent, or in the range of from 0.1 to 2 mole percent. Furthermore, at least 0.1, at least 0.5, at least 1.0, at least 1.5, or at least 2.0 mole percent of the hydrogen sulfide in the acid gas from line 12 can exit acid gas enrichment zone 10 with the hydrogen sulfide depleted off-gas in line 16.

The hydrogen sulfide depleted off-gas in line 16 can also comprise COS and/or one or more types of mercaptans, such as methyl mercaptan and ethyl mercaptan. In one or more embodiments, the hydrogen sulfide depleted off-gas in line 16 can have a combined concentration of COS and one or more types of mercaptans of at least 0.01, at least 0.037, at least 0.1, at least 0.2, or at least 0.3 mole percent. Furthermore, the hydrogen sulfide depleted off-gas in line 16 can have individual concentrations of COS and one or more types of mercaptans of at least 0.01, at least 0.037, at least 0.1, at least 0.2, or at least 0.3 mole percent each. Additionally, the hydrogen sulfide depleted off-gas in line 16 can have a combined concentration of COS and one or more types of mercaptans in the range of from about 0.01 to about 10 mole percent, in the range of from about 0.05 to about 5 mole percent, or in the range of from 0.1 to 1 mole percent. Moreover, the hydrogen sulfide depleted off-gas in line 16 can have individual concentrations of COS and one or more types of mercaptans in the range of from about 0.01 to about 10 mole percent, in the range of from about 0.05 to about 5 mole percent, or in the range of from 0.1 to 1 mole percent each. In one or more embodiments, at least 80, at least 90, or at least 95 mole percent of COS in the acid gas from line 12 can exit acid gas enrichment zone 10 with the hydrogen sulfide depleted off-gas in line 16. Additionally, at least 80, at least 90, or at least 95 mole percent of mercaptans in the acid gas from line 12 can exit acid gas enrichment zone 10 with the hydrogen sulfide depleted off-gas in line 16.

The hydrogen sulfide depleted off-gas in line 16 can also comprise a variety of other components, including, but not limited to, carbon dioxide, water, and one or more types of hydrocarbons. In one or more embodiments, the hydrogen sulfide depleted off-gas in line 16 can comprise carbon dioxide in a concentration of at least 60, at least 70, at least 80, or at least 90 mole percent. Additionally, the hydrogen sulfide depleted off-gas in line 16 can comprise carbon dioxide in an amount in the range of from about 50 to about 99 mole percent, or in the range of from 75 to 95 mole percent.

As mentioned above, a hydrogen sulfide rich sulfur absorbing solvent can be withdrawn from acid gas enrichment zone 10 via line 18. The hydrogen sulfide rich sulfur absorbing solvent in line 18 can comprise sulfur absorbing solvent, carbon dioxide, hydrogen sulfide, and other sulfur compounds, such as, for example, methyl mercaptan, ethyl mercaptan, and COS. In one or more embodiments, the hydrogen sulfide rich sulfur absorbing solvent in line 18 can comprise sulfur absorbing solvent in an amount in the range of from about 5 to about 15 mole percent. Additionally, the hydrogen sulfide rich sulfur absorbing solvent in line 18 can comprise hydrogen sulfide in an amount of at least 1 mole percent, at least 2 mole percent, at least 2.6 mole percent, at least 4 mole percent, or at least 5 mole percent. Furthermore, the hydrogen sulfide rich sulfur absorbing solvent in line 18 can comprise hydrogen sulfide in an amount of less than 20 mole percent, less than 15 mole percent, or less than 10 mole percent. Also, the hydrogen sulfide rich sulfur absorbing solvent in line 18 can comprise hydrogen sulfide in an amount in the range of from about 0.1 to about 10 mole percent. Furthermore, the hydrogen sulfide rich sulfur absorbing solvent in line 18 can have a combined concentration of COS and one or more types of mercaptans in the range of from about 0 to about 0.1 mole percent. Moreover, the hydrogen sulfide rich sulfur absorbing solvent in line 18 can have individual concentrations of COS and one or more types of mercaptans in the range of from about 0 to about 0.1 mole percent.

The hydrogen sulfide rich sulfur absorbing solvent in line 18 can be primarily in the liquid phase. In one or more embodiments, at least 80, at least 90, at least 95, or at least 99 mole percent of the hydrogen sulfide rich sulfur absorbing solvent in line 18 can be in the liquid phase. Furthermore, the hydrogen sulfide rich sulfur absorbing solvent in line 18 can have a pressure in the range of from about 0 to about 200 kPag. Additionally, the hydrogen sulfide rich sulfur absorbing solvent in line 18 can have a temperature in the range of from about 40 to about 80° C.

After exiting acid gas enrichment zone 10, the hydrogen sulfide rich sulfur absorbing solvent in line 18 can be pumped by acid gas enrichment pump 20 to acid gas enrichment heat exchanger 22 via line 24. Acid gas enrichment heat exchanger 22 can be operable to increase the temperature of the hydrogen sulfide rich sulfur absorbing solvent in line 24. In one or more embodiments, acid gas enrichment heat exchanger 22 can increase the temperature of the hydrogen sulfide rich sulfur absorbing solvent by at least 10 to about 50° C. Acid gas enrichment heat exchanger 22 can be any type of heat exchanger known or hereafter discovered in the art. In one or more embodiments, acid gas enrichment heat exchanger 22 can comprise a shell and tube type heat exchanger.

Following heat exchange, a preheated hydrogen sulfide rich sulfur absorbing solvent can be withdrawn from acid gas enrichment heat exchanger 22 via line 26. In one or more embodiments, the preheated hydrogen sulfide rich sulfur absorbing solvent can have a temperature in the range of from about 50 to about 150° C. The preheated hydrogen sulfide rich sulfur absorbing solvent in line 26 can then be introduced into regeneration zone 28.

Once in regeneration zone 28, the preheated hydrogen sulfide rich sulfur absorbing solvent can undergo a regeneration process to remove at least a portion of the hydrogen sulfide contained therein thereby creating an enriched hydrogen sulfide off-gas and a regenerated sulfur absorbing solvent. In one or more embodiments, regeneration zone 28 can operate to remove at least 50, at least 70, at least 90, or at least 95 mole percent of the hydrogen sulfide from the incoming hydrogen sulfide rich sulfur absorbing solvent. Additionally, regeneration zone 28 can operate to remove at least 50, at least 70, at least 90, or at least 95 mole percent of carbon dioxide from the hydrogen sulfide rich sulfur absorbing solvent. Any regeneration process known or hereafter discovered in the art can be employed that is suitable for removing at least a portion of a hydrogen sulfide component from a sulfur absorbing solvent. In one or more embodiments, regeneration of the hydrogen sulfide rich sulfur absorbing solvent can be accomplished by stripping hydrogen sulfide from the sulfur absorbing solvent. Such stripping can be accomplished via steam stripping. Accordingly, in one or more embodiments, regeneration zone 28 can be defined within a vessel suitable for steam stripping operations. Heat for the stripping process can be supplied to regeneration zone 28 via reboiler 30.

Reaction conditions employed in regeneration zone 28 can be any suitable conditions for achieving sulfur absorbing solvent regeneration as described herein. In one or more embodiments, the temperature employed in regeneration zone 28 can be in the range of from about 75 to about 175° C. Additionally, the pressure employed in regeneration zone 28 can be in the range of from about 0 to about 200 kPag.

Following regeneration, a regenerated sulfur absorbing solvent can be withdrawn from regeneration zone 28 via line 32. The regenerated sulfur absorbing solvent in line 32 can have a concentration of sulfur absorbing solvent of at least 5 mole percent. Additionally, the regenerated sulfur absorbing solvent in line 32 can have a concentration of hydrogen sulfide of less than 0.1 mole percent. Furthermore, the regenerated sulfur absorbing solvent in line 32 can have a combined concentration of COS and one or more types of mercaptans of less than 0.01 mole percent. In one or more embodiments, the regenerated sulfur absorbing solvent in line 32 can have a temperature in the range of from about 75 to about 175° C. Additionally, the regenerated sulfur absorbing solvent in line 32 can have a pressure in the range of from about 0 to about 200 kPag.

After being withdrawn from regeneration zone 28, the regenerated sulfur absorbing solvent in line 32 can be pumped by pump 34 to acid gas enrichment heat exchanger 22 to heat the incoming hydrogen sulfide rich sulfur absorbing solvent from line 24. Thereafter, a cooled regenerated sulfur absorbing solvent can be further cooled in cooler 36, filtered through filter 38, and routed to tail gas treatment zone 40 via line 42. Use of the regenerated sulfur absorbing solvent in tail gas treatment zone 40 is discussed in greater detail below.

The enriched hydrogen sulfide off-gas generated in regeneration zone 28 can be withdrawn via line 44. The enriched hydrogen sulfide off-gas in line 44 can be routed to reflux condenser 46, which produces a condensed reflux stream and an enriched hydrogen sulfide stream. The condensed reflux stream can be withdrawn from reflux condenser 46 via line 48 and routed back to regeneration zone 28 to be employed as reflux. The enriched hydrogen sulfide stream can be withdrawn from reflux condenser 46 via line 50 and routed to sulfur recovery zone 52.

The enriched hydrogen sulfide stream in line 50 can comprise several components, including, but not limited to, hydrogen sulfide, carbon dioxide, COS, one or more types of mercaptans, and water. In one or more embodiments, the enriched hydrogen sulfide stream in line 50 can have a concentration of hydrogen sulfide of at least 10, at least 20, at least 30, or at least 40 mole percent. Additionally, the enriched hydrogen sulfide stream in line 50 can have a hydrogen sulfide concentration in the range of from about 10 to about 90 mole percent, in the range of from about 20 to about 70 mole percent, or in the range of from 30 to 50 mole percent. In one or more embodiments, the enriched hydrogen sulfide stream in line 50 can have a carbon dioxide concentration of at least 10, at least 20, at least 30, or at least 40 mole percent. Furthermore, the enriched hydrogen sulfide stream in line 50 can have a carbon dioxide concentration in the range of from about 10 to about 90 mole percent, in the range of from about 20 to about 70 mole percent, or in the range of from 30 to 50 mole percent. In one or more embodiments, the enriched hydrogen sulfide stream in line 50 can have a combined concentration of COS and one or more types of mercaptans of less than 0.5, less than 0.1, or less than 0.05 mole percent. In one or more embodiments, the enriched hydrogen sulfide stream in line 50 can have individual concentrations of COS and one or more types of mercaptans of less than 0.5, less than 0.1, or less than 0.05 mole percent each.

As mentioned above, the enriched hydrogen sulfide stream in line 50 can be fed to sulfur recovery zone 52. Sulfur recovery zone 52 can operate to convert at least a portion of hydrogen sulfide from the enriched hydrogen sulfide stream in line 50 to elemental sulfur. In one or more embodiments, sulfur recovery zone 52 can operate to convert at least 50, at least 70, at least 90, at least 95, at least 99, at least 99.5, or at least 99.9 mole percent of the hydrogen sulfide from the enriched hydrogen sulfide stream in line 50 to elemental sulfur. Additionally, recovered elemental from sulfur recovery zone 52 can represent at least 70, at least 80, at least 90, at least 95, at least 99, at least 99.5, or at least 99.9 mole percent of the combined amount of sulfur compounds and hydrogen sulfide in the acid gas in line 12. Any means known or hereafter discovered in the art for converting hydrogen sulfide to elemental sulfur can be employed in sulfur recovery zone 52. In one or more embodiments, sulfur recovery zone 52 can employ a Claus sulfur recovery process, as will be described in greater detail below with reference to FIG. 2.

Referring still to FIG. 1, following sulfur recovery, a sulfur rich stream can be withdrawn from sulfur recovery zone 52 via line 54, and a tail gas can be withdrawn via line 56. The sulfur rich stream in line 54 can contain at least 90, at least 99, or at least 100 mole percent elemental sulfur. In one or more embodiments, the amount of sulfur recovered via sulfur recovery zone 52 can amount to recovery of a majority of all the sulfur compounds in the acid gas in line 12. In other words, a sulfur recovery system according to various embodiments of the invention can operate to recover as elemental sulfur greater than 50 weight percent of all incoming sulfur compounds (e.g., hydrogen sulfide, COS, and mercaptans) in the acid gas in line 12. In other embodiments, the sulfur recovery system can recover as elemental sulfur at least 70, at least 90, at least 95, at least 99, or at least 99.9 weight percent of all incoming sulfur compounds in the acid gas in line 12. Additionally, such sulfur recovery can be achieved over a time-averaged basis. Thus, in one or more embodiments, the above-listed minimum sulfur recoveries can each be determined as the average sulfur recovery measured over a period of at least 1 hour, at least 12 hours, at least 1 day, at least 10 days, or at least 20 days. Any time-average determination herein shall be based on a minimum of 5 measurements timed equally over the applicable time period.

The tail gas in line 56 can comprise a variety of components, including, but not limited to, hydrogen sulfide, carbon disulfide, COS, sulfur dioxide, carbon dioxide, carbon monoxide, and water. In one or more embodiments, the tail gas in line 56 can have a carbon dioxide concentration of at least 5, at least 10, or at least 20 mole percent. Additionally, the tail gas in line 56 can have a carbon dioxide concentration in the range of from about 5 to about 50 mole percent, in the range of from about 10 to about 40 mole percent, or in the range of from 20 to 30 mole percent.

In one or more embodiments, the tail gas in line 56 can have a hydrogen sulfide concentration of at least 0.1, at least 0.4, or at least 0.8 mole percent. In other embodiments, the tail gas in line 56 can have a hydrogen sulfide concentration of less than 5, less than 3, or less than 2 mole percent. Additionally, the tail gas in line 56 can have a hydrogen sulfide concentration in the range of from about 0.1 to about 5 mole percent, in the range of from about 0.4 to about 2 mole percent, or in the range of from 0.8 to 1.2 mole percent.

In one or more embodiments, the tail gas in line 56 can have a COS concentration of at least 0.01, at least 0.05, at least 0.1, or at least 0.2 mole percent. In other embodiments, the tail gas in line 56 can have a COS concentration of less than 5, less than 3, less than 1, or less than 0.5 mole percent. Additionally, the tail gas in line 56 can have a COS concentration in the range of from about 0.01 to about 5 mole percent, in the range of from about 0.05 to about 3 mole percent, in the range of from about 0.1 to about 1 mole percent, or in the range of from 0.2 to 0.5 mole percent.

In one or more embodiments, the tail gas in line 56 can have a sulfur dioxide concentration of at least 0.01, at least 0.05, at least 0.1, or at least 0.2 mole percent. In other embodiments, the tail gas in line 56 can have a sulfur dioxide concentration of less than 5, less than 3, less than 1, or less than 0.5 mole percent. Additionally, the tail gas in line 56 can have a sulfur dioxide concentration in the range of from about 0.01 to about 5 mole percent, in the range of from about 0.05 to about 3 mole percent, in the range of from about 0.1 to about 1 mole percent, or in the range of from 0.2 to 0.5 mole percent.

The tail gas in line 56 can be primarily in the vapor phase. In one or more embodiments, at least 70, at least 80, at least 90, or at least 99 mole percent of the tail gas in line 56 can be in the vapor phase. Additionally, the tail gas in line 56 can have a temperature in the range of from about 50 to about 250° C., or in the range of from 100 to 200° C. Furthermore, the tail gas in line 56 can have a pressure in the range of from about 0 to about 100 kPag, or in the range of from 20 to 70 kPag.

Following withdrawal from sulfur recovery zone 52, at least a portion of the tail gas in line 56 can be routed via line 58 to mixing zone 60, while the remaining portion can be routed to incineration zone 62 via line 64. The tail gas portion from line 64 can be incinerated and passed to stack 66 for venting to the atmosphere. In one or more embodiments, the portion of the tail gas routed to mixing zone 60 can constitute in the range of from about 0 to about 100 mole percent of the total tail gas withdrawn from sulfur recovery zone 52.

The tail gas introduced into mixing/heating zone 60 can be combined therein the with hydrogen sulfide depleted off-gas from line 16, which was withdrawn from acid gas enrichment zone 10. Mixing zone 60 can operate to heat and mix the hydrogen sulfide depleted off-gas from line 16 with the tail gas from line 58. Any methods known or hereafter discovered in the art for mixing and heating a plurality of gases can be employed in mixing/heating zone 60. In one or more embodiments, mixing/heating zone 60 can comprise a mixing unit along with an inline burner or an indirect heater. In addition to the hydrogen sulfide depleted off-gas and tail gas, a fuel gas, air stream, and/or steam can be fed to mixing zone 60 in order to combust and heat the incoming hydrogen sulfide depleted off-gas and tail gas.

In one or more embodiments, the resulting mixed and heated gas can be withdrawn from mixing zone 60 via line 68 as a hydrogenation feed stream. The hydrogenation feed stream in line 68 can comprise a variety of components, including, but not limited to, hydrogen sulfide, carbon disulfide, COS, sulfur dioxide, carbon dioxide, and water. In one or more embodiments, the hydrogenation feed stream in line 68 can have a carbon dioxide concentration of at least 10, at least 20, or at least 30 mole percent. Additionally, the hydrogenation feed stream in line 68 can have a carbon dioxide concentration in the range of from about 10 to about 70 mole percent, in the range of from about 20 to about 60 mole percent, or in the range of from 30 to 50 mole percent.

In one or more embodiments, the hydrogenation feed stream in line 68 can have a hydrogen sulfide concentration of at least 0.1, at least 0.3, or at least 0.6 mole percent. In other embodiments, the hydrogenation feed stream in line 68 can have a hydrogen sulfide concentration of less than 4, less than 2, or less than 1 mole percent. Additionally, the hydrogenation feed stream in line 68 can have a hydrogen sulfide concentration in the range of from about 0.1 to about 4 mole percent, in the range of from about 0.3 to about 2 mole percent, or in the range of from 0.6 to 1 mole percent.

In one or more embodiments, the hydrogenation feed stream in line 68 can have a combined concentration of COS and one or more types of mercaptans of at least 0.01, at least 0.037, at least 0.05, at least 0.1, or at least 0.2 mole percent. In other embodiments, the hydrogenation feed stream in line 68 can have a combined concentration of COS and one or more types of mercaptans of less than 5, less than 3, less than 1, or less than 0.5 mole percent. Additionally, the hydrogenation feed stream in line 68 can have a combined concentration of COS and one or more types of mercaptans in the range of from about 0.01 to about 5 mole percent, in the range of from about 0.05 to about 3 mole percent, in the range of from about 0.1 to about 1 mole percent, or in the range of from 0.2 to 0.5 mole percent.

In one or more embodiments, the hydrogenation feed stream in line 68 can have individual concentrations of COS and one or more types of mercaptans of at least 0.01, at least 0.05, at least 0.1, or at least 0.2 mole percent each. In other embodiments, the hydrogenation feed stream in line 68 can have individual concentrations of COS and one or more types of mercaptans of less than 5, less than 3, less than 1, or less than 0.5 mole percent each. Additionally, the hydrogenation feed stream in line 68 can have individual concentrations of COS and one or more types of mercaptans in the range of from about 0.01 to about 5 mole percent, in the range of from about 0.05 to about 3 mole percent, in the range of from about 0.1 to about 1 mole percent, or in the range of from 0.2 to 0.5 mole percent each.

In one or more embodiments, the hydrogenation feed stream in line 68 can have a sulfur dioxide concentration of at least 0.01, at least 0.05, or at least 0.1 mole percent. In other embodiments, the hydrogenation feed stream in line 68 can have a sulfur dioxide concentration of less than 5, less than 3, less than 1, or less than 0.5 mole percent. Additionally, the hydrogenation feed stream in line 68 can have a sulfur dioxide concentration in the range of from about 0.01 to about 3 mole percent, in the range of from about 0.05 to about 1 mole percent, or in the range of from 0.1 to 0.3 mole percent.

In addition to the foregoing components, the hydrogenation feed stream in line 68 can contain hydrogen and carbon monoxide, at least partly originating from gases produced during combustion in the above-mentioned inline burner. In one or more embodiments, the hydrogenation feed stream in line 68 can have a hydrogen concentration of at least 0.5, at least 1, at least 1.5, or at least 2 mole percent. Additionally, the hydrogenation feed stream in line 68 can have a hydrogen concentration in the range of from about 0.5 to about 20 mole percent, in the range of from about 1 to about 10 mole percent, in the range of from about 1.5 to about 5 mole percent, or in the range of from 2 to 3 mole percent. In one or more embodiments, the hydrogenation feed stream in line 68 can have a carbon monoxide concentration of at least 0.1, at least 0.4, or at least 0.7 mole percent. Additionally, the hydrogenation feed stream in line 68 can have a carbon monoxide concentration in the range of from about 0.1 to about 5 mole percent, in the range of from about 0.4 to about 3 mole percent, or in the range of from 0.7 to 1.1 mole percent.

The hydrogenation feed stream in line 68 can be primarily in the vapor phase. In one or more embodiments, at least 70, at least 80, at least 90, or at least 99 mole percent of the hydrogenation feed stream in line 68 can be in the vapor phase. Additionally, the hydrogenation feed stream in line 68 can have a temperature in the range of from about 100 to about 500° C., in the range of from about 200 to about 400° C., or in the range of from 250 to 350° C. Furthermore, the hydrogenation feed stream in line 68 can have a pressure in the range of from about 0 to about 100 kPag, or in the range of from 20 to 70 kPag.

Following withdrawal from mixing zone 60, the hydrogenation feed stream in line 68 can be introduced into hydrogenation zone 70. Hydrogenation zone 70 can operate to convert at least a portion of various sulfur compounds therein to hydrogen sulfide. For example, hydrogenation zone 70 can operate to convert at least a portion of COS, mercaptans, sulfur vapor, and/or sulfur dioxide to hydrogen sulfide. In one or more embodiments, hydrogenation zone 70 can operate to convert at least 50, at least 70, or at least 90 mole percent of COS from the hydrogenation feed stream to hydrogen sulfide. Additionally, hydrogenation zone 70 can operate to convert at least 50, at least 70, or at least 90 mole percent of all mercaptans (e.g., methyl mercaptan and/or ethyl mercaptan) from the hydrogenation feed stream to hydrogen sulfide. Furthermore, hydrogenation zone 70 can operate to convert at least 50, at least 70, or at least 90 mole percent of sulfur dioxide from the hydrogenation feed stream to hydrogen sulfide.

Any methods known or hereafter discovered in the art for converting the above-described sulfur compounds to hydrogen sulfide can be employed in hydrogenation zone 70. In one or more embodiments, consumption of carbon monoxide and hydrogen from the incoming hydrogenation feed stream in line 68 along with use of a hydrogenation catalyst can be employed to facilitate conversion to hydrogen sulfide in hydrogenation zone 70. Examples of commercially available hydrogenation catalysts suitable for use in hydrogenation zone 70 include, but are not limited to, CRITERION-234 or -534 (available from Criterion Catalysts & Technologies, Houston, Tex.) and AXENS TG-103 or -107 (available from Axens IFP Group Technologies, Houston, Tex.). In one or more embodiments, the hydrogenation catalyst comprises a Group VI and/or Group VIII metal sulfided catalyst.

Reaction conditions employed in hydrogenation zone 70 can be any suitable conditions for the above-described conversion of sulfur compounds to hydrogen sulfide. In one or more embodiments, the temperature employed in hydrogenation zone 70 can be in the range of from about 200 to about 350° C. Additionally, the pressure employed in hydrogenation zone 70 can be in the range of from about 0 to about 200 kPag.

Following hydrogenation in hydrogenation zone 70, a hydrogenated stream can be withdrawn via line 72. The hydrogenated stream in line 72 can comprise a variety of components, including, but not limited to, hydrogen sulfide, carbon disulfide, COS, sulfur dioxide, carbon dioxide, carbon monoxide, and water. In one or more embodiments, the hydrogenated stream in line 72 can have a carbon dioxide concentration of at least 5, at least 10, or at least 15 mole percent. Additionally, the hydrogenated stream in line 72 can have a carbon dioxide concentration in the range of from about 5 to about 40 mole percent, in the range of from about 10 to about 30 mole percent, or in the range of from 15 to 20 mole percent. In one or more embodiments, the hydrogenated stream in line 72 can have a hydrogen sulfide concentration of at least 5, at least 10, or at least 15 mole percent. Additionally, the hydrogenated stream in line 72 can have a hydrogen sulfide concentration in the range of from about 5 to about 40 mole percent, in the range of from about 10 to about 30 mole percent, or in the range of from 15 to 20 mole percent. In one or more embodiments, the hydrogenated stream in line 72 can have individual concentrations of each of COS, sulfur dioxide, and one or more types of mercaptans (e.g., methyl mercaptan and/or ethyl mercaptan) of less than 0.1, less than 0.05, less than 0.01, or less than 0.001 mole percent. In other embodiments, the hydrogenated stream in line 72 can have substantially no COS, sulfur dioxide, and/or one or more types of mercaptans (e.g., methyl mercaptan and/or ethyl mercaptan).

The hydrogenated stream in line 72 can be primarily in the vapor phase. In one or more embodiments, at least 70, at least 80, at least 90, or at least 99 mole percent of the hydrogenated stream in line 72 can be in the vapor phase. Additionally, the hydrogenated stream in line 72 can have a temperature in the range of from about 50 to about 400° C., or in the range of from 250 to 350° C. Furthermore, the hydrogenated stream in line 72 can have a pressure in the range of from about 200 to about 500 kPag, or in the range of from 300 to 400 kPag.

Following withdrawal from hydrogenation zone 70, the hydrogenated stream in line 72 can be introduced into waste heat boiler 74. Waste heat boiler 74 can operate to at least partially cool the incoming hydrogenated stream from line 72, while recovering energy in the form of heat. Any known or hereafter discovered waste heat boiler configuration can be employed for waste heat boiler 74. Following treatment in waste heat boiler 74, a cooled hydrogenated stream can be withdrawn via line 76 as a quench feed stream. In various embodiments, waste heat boiler 74 can be bypassed.

The quench feed stream in line 76 can have substantially the same composition as the hydrogenated stream in line 72, described above. Additionally, the quench feed stream in line 76 can be primarily in the vapor phase. In one or more embodiments, at least 70, at least 80, at least 90, or at least 99 mole percent of the quench feed stream in line 76 can be in the vapor phase. Additionally, the quench feed stream in line 76 can have a temperature in the range of from about 100 to about 200° C. Furthermore, the quench feed stream in line 76 can have a pressure in the range of from about 0 to about 200 kPag.

Following withdrawal from waste heat boiler 74, the quench feed stream in line 76 can be introduced into quenching zone 78. Quenching zone 78 can operate to facilitate contact between relatively cooler water and the incoming quench feed stream from line 76 thereby cooling the quench feed stream from line 76. In one or more embodiments, the quench feed stream can undergo a temperature reduction in quenching zone 78 of at least 50° C., at least 75° C., or at least 100° C.

Any methods known or hereafter discovered for quenching a substantially vapor phase stream with water can be employed in quenching zone 78. In one or more embodiments, quenching zone 78 can be defined within a quench column employing a bottoms recirculation system 80. In one or more embodiments, the water employed in quenching zone 78 can have a temperature in the range of from about 25 to about 45° C. Additionally, the water and the quench feed stream from line 76 can be present in quenching zone 78 in a molar ratio in the range of from about 5 to about 15.

Following treatment in quenching zone 78, a tail gas treatment feed stream can be withdrawn via line 82. The tail gas treatment feed stream in line 82 can have substantially the same composition as the quench feed stream in line 76, described above. Additionally, the tail gas treatment feed stream in line 82 can be primarily in the vapor phase. In one or more embodiments, at least 70, at least 80, at least 90, or at least 99 mole percent of the tail gas treatment feed stream in line 82 can be in the vapor phase. Furthermore, the tail gas treatment feed stream in line 82 can have a temperature in the range of from about 25 to about 45° C. Moreover, the tail gas treatment feed stream in line 82 can have a pressure in the range of from about 0 to about 200 kPag.

Following withdrawal from quenching zone 78, the tail gas treatment feed stream in line 82 can be introduced into tail gas treatment zone 40. Tail gas treatment zone 40 can operate to facilitate contact between the tail gas treatment feed stream from line 82 and the regenerated sulfur absorbing solvent introduced via line 42, as mentioned above. Such contact can allow hydrogen sulfide contained in the tail gas treatment feed stream from line 82 to be absorbed by the regenerated sulfur absorbing solvent from line 42 thereby producing a partially-loaded sulfur absorbing solvent and a tail gas treatment off-gas. In one or more embodiments, contact between the regenerated sulfur absorbing solvent from line 42 and the tail gas treatment feed stream from line 82 can be sufficient to remove at least 90, at least 95, or at least 99.9 mole percent of hydrogen sulfide from the tail gas treatment feed stream. Additionally, contact between the regenerated sulfur absorbing solvent from line 42 and the tail gas treatment feed stream from line 82 can be sufficient to remove in the range of from about 90 to about 100, in the range of from about 95 to about 100, or in the range of from 99 to 100 mole percent of hydrogen sulfide from the tail gas treatment feed stream.

Any methods or apparatus known or hereafter discovered in the art suitable to facilitate such contact can be employed in tail gas treatment zone 40. In one or more embodiments, tail gas treatment zone 40 can be defined within a tail gas treatment absorber vessel that is configured to facilitate counter-current contact between the tail gas treatment feed stream from line 82 and the regenerated sulfur absorbing solvent from line 42. Such a tail gas treatment absorber vessel can comprise an upper inlet for receiving the regenerated sulfur absorbing solvent from line 42 and a lower inlet for receiving the tail gas treatment feed stream from line 82. In one or more embodiments, tail gas treatment zone 40 can be defined within a packed or tray column. If a tray column is employed, tail gas treatment zone 40 can comprise a plurality of contact-enhancing valve trays. In one or more embodiments, tail gas treatment zone 40 can have in the range of from about 3 to about 30 valve trays. In other embodiments, when a packed column is employed, tail gas treatment zone 40 can have in the range of from about 1 to about 10 theoretical plates.

Reaction conditions employed in tail gas treatment zone 40 can be any suitable conditions for achieving tail gas treatment as described herein. In one or more embodiments, the temperature employed in tail gas treatment zone 40 can be in the range of from about 25 to about 45° C. Additionally, the pressure employed in tail gas treatment zone 40 can be in the range of from about 0 to about 200 kPag. Furthermore, the above-mentioned tail gas treatment feed stream from line 82 and the regenerated sulfur absorbing solvent from line 42 can be present in tail gas treatment zone 40 in a molar ratio in the range of from about 0.01 to about 1, in the range of from about 0.1 to about 0.5, or in the range of from 0.15 to 0.25.

Following treatment in tail gas treatment zone 40, the partially-loaded sulfur absorbing solvent can be withdrawn via line 84 and pumped by pump 86 via line 14 for use in acid gas enrichment zone 10, as described above. Although not depicted, the partially-loaded sulfur absorbing solvent can optionally be cooled prior to being introduced into acid gas enrichment zone 10. Such cooling can be performed by a cooler or condenser interposed between pump 86 and acid gas enrichment zone 10. The off-gas produced in tail gas treatment zone 40 can be withdrawn via line 88. The tail gas treatment off-gas in line 88 can comprise a variety of components, including, but not limited to, hydrogen sulfide, carbon disulfide, COS, sulfur dioxide, carbon dioxide, carbon monoxide, and water. In one or more embodiments, the tail gas treatment off-gas in line 88 can have a carbon dioxide concentration of at least 10, at least 25, or at least 40 mole percent. Additionally, the tail gas treatment off-gas in line 88 can have a carbon dioxide concentration in the range of from about 10 to about 90 mole percent, in the range of from about 25 to about 75 mole percent, or in the range of from 40 to 60 mole percent. In one or more embodiments, the tail gas treatment off-gas in line 88 can have a hydrogen sulfide concentration of less than 0.1, less than 0.05, or less than 0.02 mole percent. In one or more embodiments, the tail gas treatment off-gas in line 88 can have individual concentrations of each of COS, sulfur dioxide, and one or more types of mercaptans (e.g., methyl mercaptan and/or ethyl mercaptan) of less than 0.1, less than 0.05, less than 0.01, or less than 0.001 mole percent. In other embodiments, the tail gas treatment off-gas in line 88 can contain substantially no COS, sulfur dioxide, and/or one or more types of mercaptans (e.g., methyl mercaptan and/or ethyl mercaptan).

The tail gas treatment off-gas in line 88 can be primarily in the vapor phase. In one or more embodiments, at least 70, at least 80, at least 90, or at least 99 mole percent of the tail gas treatment off-gas in line 88 can be in the vapor phase. Additionally, the tail gas treatment off-gas in line 88 can have a temperature in the range of from about 0 to about 100° C., or in the range of from 20 to 70° C. Furthermore, the tail gas treatment off-gas in line 88 can have a pressure in the range of from about 10 to about 50 kPag, or in the range of from 15 to 30 kPag.

Following withdrawal from tail gas treatment zone 40, the tail gas treatment off-gas in line 88 can be introduced into incineration zone 62. Incineration zone 62 can operate to incinerate the tail gas treatment off-gas from line 88. Thereafter, the resulting incinerated gas can be passed to stack 66 for venting to the atmosphere.

Referring still to FIG. 1, the foregoing description describes a process where a sulfur absorbing solvent can circulate from regeneration zone 28 to tail gas treatment zone 40, then from tail gas treatment zone 40 to acid gas enrichment zone 10, then from acid gas enrichment zone 10 back to regeneration zone 28. In one or more embodiments, the sulfur absorbing solvent can have a circulation rate of less than 80 m³/hr, less than 70 m³/hr, less than 60 m³/hr, or less than 50 m³/hr. As used herein, the term "circulation rate" shall denote the time-averaged flow rate of a sulfur absorbing solvent between at least two process steps, such as, for example, an acid gas enrichment step, a regeneration step, and/or a tail gas treatment step, such as those described herein, as measured over a period of one hour by at least 5 equally spaced measurements.

Referring now to FIG. 2, a sulfur recovery unit 110 is depicted. Sulfur recovery unit 110 is essentially a Claus sulfur recovery system and can be employed in sulfur recovery zone 52, described above with reference to FIG. 1. During operation of sulfur recovery unit 110, an enriched hydrogen sulfide stream can initially be introduced via line 112 into thermal reactor 114. The enriched hydrogen sulfide stream 112 can be substantially the same as the enriched hydrogen sulfide stream in line 50, described above with reference to FIG. 1.

During Claus sulfur recovery, hydrogen sulfide from the enriched hydrogen sulfide stream is converted to elemental sulfur by initially oxidizing a portion of the hydrogen sulfide according to the following reaction:

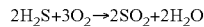

$$2H_2S + 3O_2 \rightarrow 2SO_2 + 2H_2O$$

Thereafter, the resulting sulfur dioxide reacts with hydrogen sulfide remaining in the stream to form elemental sulfur according to the following reaction:

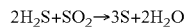

$$2H_2S + SO_2 \rightarrow 3S + 2H_2O$$

Referring still to FIG. 2, thermal reactor 114 can operate to thermally oxidize the incoming enriched hydrogen sulfide stream from line 112. The oxidized stream can then be routed via line 116 to a first Claus condenser 118 where elemental sulfur can be withdrawn as a condensate via line 120. The sulfur rich stream in line 120 can have substantially the same composition as the sulfur rich stream in line 54, described above with reference to FIG. 1. The remaining vapor phase can be withdrawn from first Claus condenser 118 via line 122. Thereafter, the vapor phase stream in line 122 can be passed through preheater 124 to heat the stream, which can then be routed via line 126 to first Claus reactor 128.

In first Claus reactor 128, conversion of hydrogen sulfide to elemental sulfur continues under catalytic conditions. Catalysts suitable for use in first Claus reactor 128 include any Claus catalysts known or hereafter discovered in the art. Examples of such catalysts include, but are not limited to, activated aluminum (III) oxide and titanium (IV) oxide. Following reaction in first Claus reactor 128, the treated stream can be routed via line 130 to second Claus condenser 132 where elemental sulfur can be withdrawn as a condensate via line 134. The sulfur rich stream in line 134 can have substantially the same composition as the sulfur rich stream in line 54, described above with reference to FIG. 1. The remaining vapor phase can be withdrawn from second Claus condenser 132 via line 136. Thereafter, the vapor phase stream in line 136 can be passed through preheater 138 to heat the stream, which can then be routed via line 140 to second Claus reactor 142.

In second Claus reactor 142, conversion of hydrogen sulfide to elemental sulfur continues under catalytic conditions. Catalysts suitable for use in second Claus reactor 142 can be the same as those described above as being suitable for use in first Claus reactor 128. Following reaction in second Claus reactor 142, the treated stream can be routed via line 144 to third Claus condenser 146 where elemental sulfur can be withdrawn as a condensate via line 148. The sulfur rich stream in line 148 can have substantially the same composition as the sulfur rich stream in line 54, described above with reference to FIG. 1. The remaining vapor phase can be withdrawn as a Claus tail gas from third Claus condenser 146 via line 150. The Claus tail gas in line 150 can have substantially the same composition as the tail gas in line 56, described above with reference to FIG. 1.

Although the invention has been described with reference to the embodiments illustrated in the attached drawing figures, it is noted that equivalents may be employed and substitutions made herein without departing from the scope of the invention as recited in the claims.

Selected Definitions

It should be understood that the following is not intended to be an exclusive list of defined terms. Other definitions may be provided in the foregoing description accompanying the use of a defined term in context.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "containing," "contains," and "contain" have the same open-ended meaning as "comprising," "comprises," and "comprise" provided above.

As used herein, the terms "having," "has," and "have" have the same open-ended meaning as "comprising," "comprises," and "comprise" provided above.

As used herein, the terms, "including," "include," and "included" have the same open-ended meaning as "comprising," "comprises," and "comprise" provided above.

Numerical Ranges

The present description uses numerical ranges to quantify certain parameters relating to various embodiments of the invention. It should be understood that when numerical ranges are provided, such ranges are to be construed as providing literal support for claim limitations that only recite the lower value of the range as well as claim limitations that only recite the upper value of the range. For example, a disclosed numerical range of 10 to 100 provides literal support for a claim reciting "greater than 10" (with no upper bounds) and a claim reciting "less than 100" (with no lower bounds).

What is claimed is:

1. A process for recovering sulfur from an acid gas comprising hydrogen sulfide, said method comprising:
    contacting said acid gas with a partially-loaded sulfur absorbing solvent in an acid gas enrichment zone to thereby produce a hydrogen sulfide rich sulfur absorbing solvent and a hydrogen sulfide depleted off-gas, wherein said hydrogen sulfide depleted off-gas comprises hydrogen sulfide in an amount of at least 0.5 mole percent, wherein prior to said contacting, said partially-loaded sulfur absorbing solvent comprises hydrogen sulfide in an amount of at least 0.01 mole percent, and wherein said hydrogen sulfide depleted off-gas comprises carbonyl sulfide and one or more types of mercaptans in a combined concentration of at least 0.037 mole percent; and
    hydrogenating at least a portion of said hydrogen sulfide depleted off-gas thereby converting at least a portion of said mercaptans and/or said carbonyl sulfide in said hydrogen sulfide depleted off-gas to hydrogen sulfide.

2. The process of claim 1, wherein said acid gas comprises said hydrogen sulfide in a concentration of at least 1 mole percent.

3. The process of claim 1, wherein said hydrogen sulfide depleted off-gas comprises hydrogen sulfide in an amount of at least 1.0 mole percent.

4. The process of claim 1, wherein said acid gas comprises carbonyl sulfide and one or more types of mercaptans in a combined concentration of at least 0.05 mole percent.

5. The process of claim 4, wherein at least 80 mole percent of said carbonyl sulfide and said mercaptans in said acid gas exit said acid gas enrichment zone with said hydrogen sulfide depleted off-gas.

6. The process of claim 4, wherein said mercaptans comprise methyl mercaptan and/or ethyl mercaptan.

7. The process of claim 1, further comprising, prior to said hydrogenating, combining said hydrogen sulfide depleted off-gas with a Claus tail gas produced during a Claus sulfur recovery process to thereby form a hydrogenation feed stream.

8. The process of claim 7, wherein said hydrogenation feed stream comprises said mercaptans and said carbonyl sulfide in a combined concentration of at least 0.05 mole percent, wherein said hydrogenating converts at least 50 mole percent of the combined concentration of said mercaptans and said carbonyl sulfide in said hydrogenation feed stream to hydrogen sulfide.

9. The process of claim 1, wherein said partially-loaded sulfur absorbing solvent comprises hydrogen sulfide in an amount of from 0.01 to 0.6 mole percent.

10. The process of claim 1, wherein said partially-loaded sulfur absorbing solvent is formed in a tail gas treatment zone upstream of said acid gas enrichment zone by contacting a regenerated sulfur absorbing solvent with a tail gas treatment feed stream, wherein said tail-gas treatment feed stream is prepared by hydrogenating a hydrogenation feed stream comprising a Claus tail gas produced during a Claus sulfur recovery process and at least a portion of a hydrogen sulfide depleted off-gas.

11. The process of claim 1, wherein said partially-loaded sulfur absorbing solvent comprises a polyalkanol amine.

12. The process of claim 1, wherein said acid gas and said partially-loaded sulfur absorbing solvent are present in a molar ratio in the range of from about 0.01:1 to about 1:1.

13. The process of claim 1, further comprising routing at least a portion of said hydrogen sulfide rich sulfur absorbing solvent to a regeneration zone and therein separating at least a portion of the hydrogen sulfide from said hydrogen sulfide rich sulfur absorbing solvent thereby forming an enriched hydrogen sulfide stream and a regenerated sulfur absorbing solvent.

14. The process of claim 13, further comprising routing at least a portion of said enriched hydrogen sulfide stream to a Claus sulfur recovery process, wherein said Claus sulfur recovery process converts at least a portion of said hydrogen sulfide in said enriched hydrogen sulfide stream into elemental sulfur thereby generating a sulfur rich stream and a Claus tail gas.

15. The process of claim 1, wherein said hydrogen sulfide rich sulfur absorbing solvent has a hydrogen sulfide content of at least 2.6 mole percent.

16. The process of claim 1, wherein said acid gas further comprises a plurality of sulfur compounds in addition to said hydrogen sulfide, wherein said sulfur recovery process recovers as elemental sulfur at least 99.5 weight percent of the total amount of said sulfur compounds and said hydrogen sulfide from said acid gas.

17. A process for recovering sulfur from an acid gas comprising hydrogen sulfide, said process comprising:
    (a) contacting said acid gas in an acid gas enrichment zone with a partially-loaded sulfur absorbing solvent to thereby produce a hydrogen sulfide rich sulfur absorbing solvent and a hydrogen sulfide depleted off-gas;
    (b) removing at least a portion of said hydrogen sulfide from said hydrogen sulfide rich sulfur absorbing solvent to thereby produce an enriched hydrogen sulfide stream and a regenerated sulfur absorbing solvent; and
    (c) contacting at least a portion of said regenerated sulfur absorbing solvent with a hydrogenated stream containing hydrogen sulfide to thereby produce said partially-loaded sulfur absorbing solvent,
    wherein the hydrogen sulfide content of said hydrogen sulfide rich sulfur absorbing solvent is at least 2.6 mole percent.

18. The process of claim 17, wherein said acid gas comprises said hydrogen sulfide in a concentration of at least 1.0 mole percent, wherein at least 1.0 mole percent of said hydrogen sulfide in said acid gas exits said acid gas enrichment zone with said hydrogen sulfide depleted off-gas.

19. The process of claim 17, wherein said hydrogen sulfide depleted off-gas comprises hydrogen sulfide in an amount of at least 0.5 mole percent, wherein said acid gas comprises carbonyl sulfide and one or more types of mercaptans in a combined concentration of at least 0.025 mole percent.

20. The process of claim 19, wherein at least 80 mole percent of said carbonyl sulfide and said mercaptans in said acid gas exit said acid gas enrichment zone with said hydrogen sulfide depleted off-gas.

21. The process of claim 19, further comprising hydrogenating at least a portion of said hydrogen sulfide depleted off-gas thereby converting at least a portion of said mercaptans and/or said carbonyl sulfide in said hydrogen sulfide depleted off-gas to hydrogen sulfide.

22. The process of claim 21, further comprising, prior to said hydrogenating, combining said hydrogen sulfide depleted off-gas with a Claus tail gas produced during a Claus sulfur recovery process to thereby form a hydrogenation feed stream.

23. The process of claim 17, wherein said partially-loaded sulfur absorbing solvent comprises hydrogen sulfide in an amount of 0.60 mole percent or less.

24. The process of claim 17, wherein said sulfur absorbing solvent comprises a polyalkanol amine.

25. The process of claim 17, further comprising routing at least a portion of said enriched hydrogen sulfide stream to a Claus sulfur recovery process, wherein said Claus sulfur recovery process converts at least a portion of said hydrogen sulfide in said enriched hydrogen sulfide stream into elemental sulfur thereby generating a sulfur rich stream and a Claus tail gas.

26. The process of claim 17, wherein the hydrogen sulfide content of said hydrogen sulfide rich sulfur absorbing solvent is at least 3.0 mole percent.

27. A process for recovering sulfur from an acid gas comprising hydrogen sulfide, said method comprising contacting said acid gas with a partially-loaded sulfur absorbing solvent in an acid gas enrichment zone to thereby produce a hydrogen sulfide rich sulfur absorbing solvent and a hydrogen sulfide depleted off-gas, wherein said hydrogen sulfide depleted off-gas comprises hydrogen sulfide in an amount of at least 0.5 mole percent, wherein prior to said contacting, said partially-loaded sulfur absorbing solvent comprises hydrogen sulfide in an amount of at least 0.01 mole percent, wherein said partially-loaded sulfur absorbing solvent is formed in a tail gas treatment zone upstream of said acid gas enrichment zone by contacting a regenerated sulfur absorbing solvent with a tail gas treatment feed stream, wherein said tail-gas treatment feed stream is prepared by hydrogenating a hydrogenation feed stream comprising a Claus tail gas produced during a Claus sulfur recovery process and at least a portion of a hydrogen sulfide depleted off-gas.

* * * * *